United States Patent [19]
Majima

[11] Patent Number: 6,101,014
[45] Date of Patent: Aug. 8, 2000

[54] WAVELENGTH CONTROLLING METHOD ENABLING USE OF WIDER WAVELENGTH RANGE AND NETWORK SYSTEM USING THE METHOD

[75] Inventor: Masao Majima, Isehara, Japan

[73] Assignee: Canon Kabushiki Kaisha, Tokyo, Japan

[21] Appl. No.: 08/862,369

[22] Filed: May 23, 1997

[30] Foreign Application Priority Data

May 27, 1996 [JP] Japan .................................. 8-131862
May 19, 1997 [JP] Japan .................................. 9-128202

[51] Int. Cl.$^7$ .................................................. H04B 10/00
[52] U.S. Cl. ........................................................ 359/164
[58] Field of Search .................................. 359/111, 121, 359/124, 164, 168

[56] References Cited

U.S. PATENT DOCUMENTS

| | | | |
|---|---|---|---|
| 5,379,318 | 1/1995 | Weber | 372/96 |
| 5,390,043 | 2/1995 | O'Byrne | 359/191 |
| 5,552,919 | 9/1996 | Majima et al. | 359/161 |
| 5,594,577 | 1/1997 | Majima et al. | 359/124 |
| 5,654,814 | 8/1997 | Ouchi et al. | 359/156 |

FOREIGN PATENT DOCUMENTS

| | | |
|---|---|---|
| 0 438 155 | 7/1991 | European Pat. Off. . |
| 8-163092 | 6/1996 | Japan . |

OTHER PUBLICATIONS

Öberg, M., et al., "A Three–Electrode Distributed Bragg Reflector Laser with 22 nm Wavelength Tuning Range", IEEE Photonics Technology Letters, vol. 3, No. 4, pp. 299–301 (Apr. 1991).

Ouchi, T., et al., "Polarization Switching in AlGaAs/GaAs Distributed Feedback Lasers Between the Stable Single Longitudinal Modes", Applied Physics Letters, vol. 67, No. 23, pp. 3405–3407 (Dec. 1995).

Kotaki, Y., et al., "Long Cavity $\lambda/4$–Shifted MQW–DFB Laser With Three Electrodes", Technical Report of the Institute of Electronics, Information and Communication Engineers (OQE 89–116), vol. 89, No. 329, pp. 61–66 (Dec. 1989). In Japanese.

Miller, C., "A Field–Worthy, High–Performance, Tunable Fiber Fabry–Perot Filter", European Conference on Optical Communication (ECOC '90–605), pp. 605–608. 1990 (No Month).

*Primary Examiner*—Teresa M. Arroyo
*Assistant Examiner*—Robert E. Wise
*Attorney, Agent, or Firm*—Fitzpatrick, Cella, Harper & Scinto

[57] ABSTRACT

A method of controlling a wavelength of emitted light in a network system having a light transmission line for transmitting light, light-emitting means having a plurality of discrete continuous-wavelength-tunable ranges and emitting the light to the light transmission line, and detecting means for detecting light on the light transmission line, includes detecting, by the detecting means, a wavelength falling within one of the plurality of continuous-wavelength-tunable ranges of the light-emitting means which does not interfere with any wavelengths of light being transmitted on the light transmission line, and emitting, to the light transmission line, light from the light-emitting means at the wavelength detected in said detecting step.

23 Claims, 11 Drawing Sheets

WAVELENGTH CONTROLLING METHOD ENABLING USE OF WIDER WAVELENGTH RANGE AND NETWORK SYSTEM USING THE METHOD

BACKGROUND OF THE INVENTION

1. Field of the Invention

The present invention relates to a method of controlling wavelength used in wavelength multiplex communication networks and also to a network system using the wavelength controlling method.

2. Description of the Related Art

In general, a wavelength multiplex communication network system employs a multiplicity of independent channels arranged in a single transmission line such that each channel performs communication independently of other channels. Such a wavelength multiplex communication network system does not necessitate frame synchronization or other multiplexing processing along the time axis and, hence, does not require coincidence of transmission rates of different channels. This type of communication network system, therefore, is suitable for use in multi-media communications in which flexibility or adaptability of the network is an important requisite.

A wavelength multiplex communication network system has, for example, a number of terminal stations, each having a combination of a wavelength tunable optical transmitter and receiver. In operation, the transmitting terminal station controls the wavelength tunable optical transmitter such that the transmitter transmits light of a wavelength which is not being used on the network communication transmission line, while the receiving station controls a tunable optical filter of the optical receiver such that the central wavelength of the spectrum passed by the filter coincides with the wavelength of the light to be received. Thus, the range of wavelength which can be used in the wavelength multiplex communication network system is governed by the ranges over which the wavelengths of the optical transmitter and receiver are variable. Meanwhile, the wavelength spacing of the channels (referred to as "channel spacing", hereinafter) is determined by the width of the spectrum transmitted through the optical filter of the optical receiver.

A semiconductor laser (referred to as "LD", hereinafter) of the wavelength tunable type can be used as the wavelength tunable light source. Research in recent years has been aimed towards widening the range of wavelength variation. At present, LDs of the multi-electrode DBR (Distributed Bragg Reflector) type and the multi-electrode DFB (Distributed Feedback) type have been put to practical use. These LDs have wavelength tunable ranges on the order of several nanometers (nm). An example of such multi-electrode LD is shown in TRI-ELECTRODE RESONATOR λ/4 SHIFT MQW-DFB LASER, Technical Report of the Institute of Electronics, Information and Communication Engineers, OQE (Optical and Quantum Electronics), 89–116. The tunable optical filter may also be a Fabry-Perot resonator-type filter. This type of filter, which has been put to practical use, has a wavelength tunable range of several tens of nm and a spectral width of 0.1 nm. An example of this type of filter is shown in "A field-worthy, high-performance, tunable fiber Fabry-Perot filter" preprint, ECOC (European Conference on Optical Comunication) '90–605.

The number of channels in a wavelength multiplex communication network system having a given range of wavelength variation can be increased by reducing the channel spacing. In order to reduce the channel spacing to a value which is not greater than the width of fluctuation caused by drifting of wavelengths of the tunable LD and tunable optical filter, it is necessary that the influence of drift is suppressed by a suitable control. To this end, it is necessary to stabilize the wavelength both absolutely and relatively. However, it is not easy to obtain an absolute reference for wavelength. Relative wavelength stabilization is also difficult to achieve, particularly in a communication network such as a LAN in which optical transmitters are located at remote places.

The state of the art is such that the continuous wavelength tunable range afforded by tunable optical filters is greater than that of tunable LDs. For instance, while the continuous wavelength tunable range of a typical tunable LD is on the order of several nm, the range over which the wavelength transmissible through the tunable optical filter well exceeds 10 nm. Therefore, in a system in which tunable LD is used as light-emitting means while a tunable optical filter is used as detecting means, the continuous wavelength tunable range of tunable LD is one factor limiting the number of the channels.

It has been known that there is a type of light-emitting means which can materially expand the range of wavelength variation of the emitted light, on condition that discontinuities of wavelength are allowed to be present in the wavelength tunable range. For instance, a certain type of tunable LD can exhibit an expanded wavelength tunable range of 10 nm or greater when discontinuities of wavelength are permitted. An example of such tunable LD is disclosed in IEEE Photonics Technology Letters, "A Three-Electrode Distributed Bragg Reflector Laser With 22 nm Wavelength Tuning Range," Vol. 3, No. 4, pp 299–301, (1991). More specifically, this LD is a three-electrode DBR-LD which has a gain-current supply electrode, a phase-current supply electrode and a Bragg-current supply electrode. It is reported that an to expanded range of luminescent wavelength spanning about 22 nm between 1512 nm and 1534 nm, when the current supplied to the Bragg electrode is varied between −120 mA and +120 mA, while the gain-current supply electrode is supplied with a constant current of 175 mA. It is also reported that there are about 20 discontinuities within the above-mentioned expanded range.

SUMMARY OF THE INVENTION

An object of the present invention is to provide a wavelength controlling method in which the number of channels is not limited by the width of a single continuous variable range of wavelength of emitted light.

The present invention provides a wavelength controlling method which enables the use of advantages of light emitting means, such as the means described above, having a plurality of discrete continuous wavelength tunable ranges.

According to one aspect of the present invention, there is provided an emission light wavelength controlling method for use in a network system having a light transmission line for transmitting light, a light-emitting device having a number of discrete continuous-wavelength-tunable ranges and outputting light to the light transmission line, and a detector for detecting light on the light transmission line. The method includes a step of detecting, using the detecting means, a wavelength which falls within any one of the continuous-wavelength-tunable ranges of the light-emitting device and which does not interfere with any other light when delivered by the light-emitting device to the light transmission line. The method also includes a step of delivering, to the light transmission line, the output light from the light-emitting device at the wavelength which falls within one of the continuous-wavelength-tunable ranges of the light-emitting device and which does not interfere with other light.

According to this controlling method, it is possible to control the wavelength of light emitted from a light-emitting device having a plurality of discrete continuous wavelength tunable ranges, without the risk of interference with other light.

The step of detecting the wavelength which falls within any one of the continuous-wavelength-tunable ranges of the light-emitting device and which does not interfere with other light may include: a first sub-step of detecting, using the detecting means; a wavelength which does not interfere with other light; a second sub-step of controlling the detecting means such that the detecting means can detect light of the detected wavelength which does not interfere with other light; and a third sub-step of varying the wavelength of the output light from the light-emitting device and discriminating whether or not the detecting means detects the output light from the light-emitting device. Executing such sub-steps enables detection of a wavelength which falls within one of the continuous-wavelength-tunable ranges of the light-emitting device and which does not interfere with other light, even when the wavelength tunable range of the light-emitting device is unknown. When there are a number of wavelengths which do not interfere with the other light, while the detecting means fails to detect the output light from the light-emitting device despite execution of the second and third sub-steps, the method may be carried out by repeating the second and third sub-steps. In such a situation, the second sub-step controls the detecting means to enable the detecting means to detect another wavelength from among the wavelengths which do not interfere with the other light. This second sub-step is followed by the third sub-step. The second and third sub-steps are repeated until the detecting means detects the output light from the light-emitting device.

On the other hand, when the wavelength tunable range of the light-emitting device is known, the step of detecting the wavelength which falls within one of the continuous-wavelength-tunable ranges of the light-emitting device and which does not interfere with other light may be carried out by executing a sub-step of detecting, using the detecting means, a wavelength which does not interfere with other light, and a sub-step of discriminating whether or not the detected wavelength falls within one of the continuous-wavelength-tunable ranges of the light-emitting mean which have been stored.

The method may further include a step of controlling, after the execution of the delivering step, the wavelength of the output light so that the wavelength is spaced a predetermined amount from an adjacent wavelength or is maintained at an end of the continuous-wavelength-tunable range.

Various methods are available for preserving predetermined spacing between the adjacent wavelengths. For instance, the predetermined spacing may be preserved by a process including controlling the detecting means to vary the wavelength detectable by the detecting means, by changing the value of a parameter which determines the detectable wavelength. The process also includes detecting, by the detecting means thus controlled, both the wavelength of the output light, from the light-emitting means and the above-mentioned adjacent wavelength. In addition, the process includes comparing the values of the parameter with which the wavelength of the output light and the wavelength of the adjacent wavelength were detected, thereby detecting the difference between the parameter values. The parameter may be, for instance, a voltage or current for controlling a tunable optical filter for varying the wavelength selectable by the tunable optical filter when such a filter is used as the detecting means. The process also includes controlling the light-emitting means to increase the spacing between the wavelength of the output light and the adjacent wavelength when the difference in the parameter value is small, and to decrease the spacing when the difference in the parameter value is large. It is to be noted, however, the relationship between the parameter value and the detectable wavelength is not always linear. The process, therefore, may be carried out while effecting any necessary compensation for each of the wavelength ranges to be detected.

Another way of preserving the predetermined spacing between the wavelengths employs first and second detecting means which are in fixed wavelength relationship with each other. The first detecting means is adapted to detect the wavelength of the output light from the light-emitting means, while the second detecting means detects the adjacent wavelength. Then, while the second detecting means is detecting the adjacent wavelength, a servo control is performed to vary the to wavelength of the output light from the light-emitting means until the wavelength of the output light is detected by the first detecting means. In this way, the required spacing is preserved between the wavelength of the output light and the adjacent wavelength.

The method also may be carried out such that the delivery of the output light from the light-emitting means to the transmitting line is prohibited until the wavelength of the output light is set not to interfere with the other light. Alternatively, the method may be carried out such that the delivery of the output light from the light-emitting means to part of the transmitting line is prohibited until the wavelength of the output light is set not to interfere with the other light. Thus, the delivery of the output light is controlled to avoid any interference which otherwise may be caused by delivering light of a wavelength which risks interference. A device controllable to selectively deliver output light or, alternatively, a device which performs change-over of a light path, may be used as the means for selectively delivering the output light to the transmission line or as the means for delivering the output light only to a selected portion of the transmission line. Both types of device are known and available as optical switches.

When the network system has a portion in which interference is permissible, the method of the invention does not exclude delivery to such a portion of output light which has not been controlled to avoid interference with any other light. For instance, the arrangement may be such that the light-emitting means is provided in an optical node which also accommodates the detecting means and output control means for selectively delivering the output light of the light-emitting means to the transmission line. With this arrangement, the output light from the light-emitting means is delivered to the detecting means and is controlled to a wavelength which does not interfere with any other light, before the output light is actually delivered to any portion of the transmission line through the optical node.

The situation, however, is different when the network has a star-type arrangement, in particular when the light-emitting means and the light detecting means are far away from each other and communicable only it through the transmission line which is inherently intended for communication, i.e., when there is no other separate line between the light emitting and receiving means. Thus, the light from the light-emitting means reaches the detecting means along the transmission line which is intended for use in communication. An advisable arrangement for such case involves disposing a device, such as an optical switch, in the star coupler of the star connection. The optical switch permits light from the light-emitting means to reach the detecting means but not to reach other output ports which are connected to other light-emitting means and other light-receiving means, while performing control to set the output light to a wavelength which does not interfere with any other light. The portion of the transmission line between the light-emitting means and the star coupler is a portion which permits interference. Thus, the delivery of the output light to that portion of the transmitting line does not matter, even if the wavelength of the output light potentially risks interference with other light.

The network system in accordance with the present invention may be constructed such that the transmission line has a number of transmission sub-lines which are coupled through a optical-coupler. The optical-coupler has at least one input port and a number of output ports to which the light inputted from the input port is passed. Practically, a star coupler can suitably be used as the optical-coupler.

DESCRIPTION OF THE PREFERRED EMBODIMENTS

Before turning to the detailed description of the invention, a reference is made to a wavelength controlling method based on a technique disclosed in a co-pending Japanese Patent Application No. 8-163092 (JP '092) filed by the same applicant in order to facilitate understanding of the present invention. According to this method shown in JP '092, when transmissions are performed by a plurality of optical transmitters, the wavelengths of the light outputs from the optical transmitters are disposed at a predetermined spacing from the longer-wavelength end towards the shorter-wavelength end or vice versa, in accordance with the order of the timing of commencement of the transmission. This method therefore does not require any absolute wavelength reference. Spacing between each channel and adjacent channels is maintained based on the result of sweeping of wavelength region around the wavelength of each optical transmitter performed by a tunable optical filter.

Figure 4:
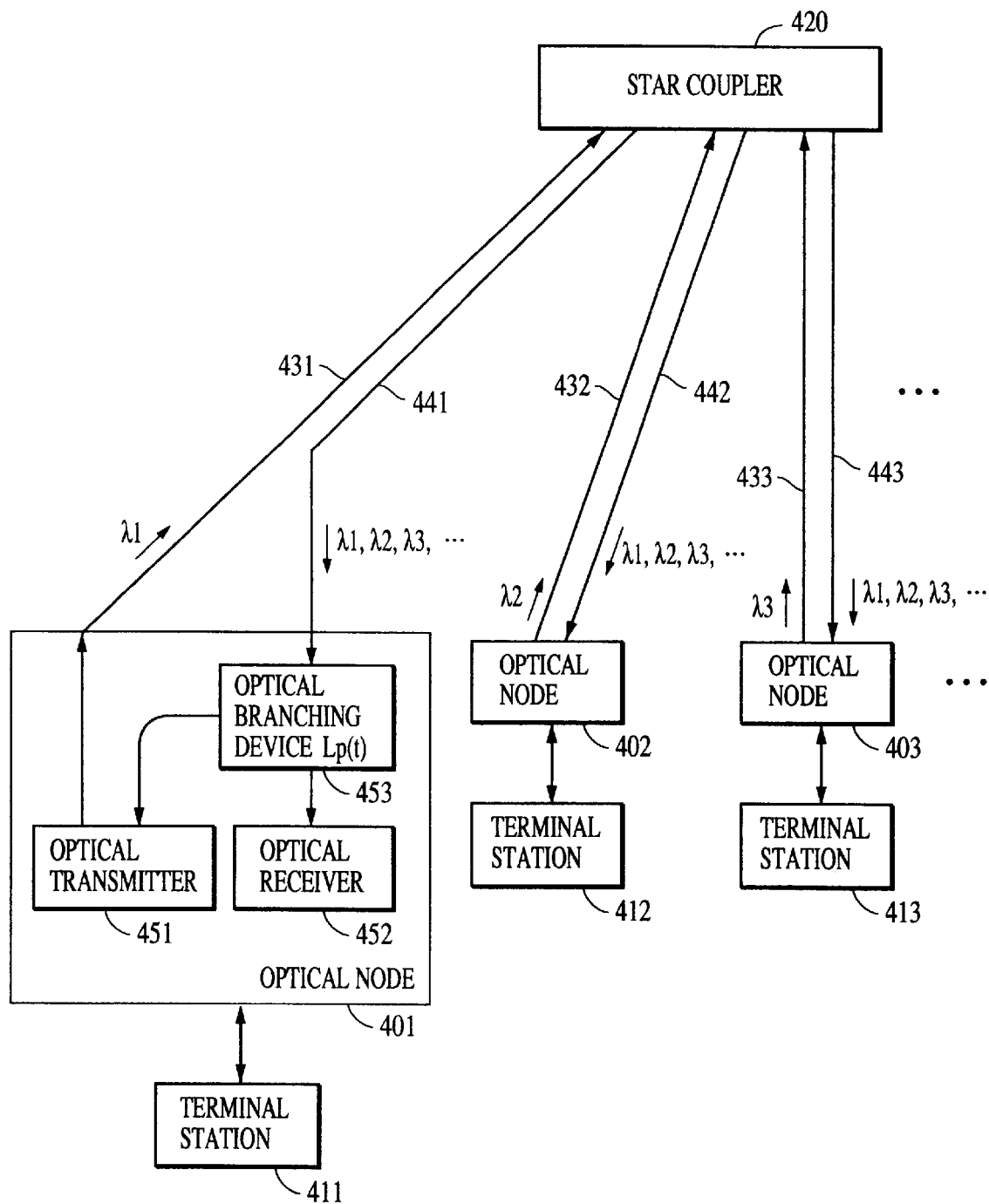
FIG. 4 is an illustration of the construction of a WDM network system.

FIG. 4 illustrates an example of wavelength-division-multiplexing (WDM) communication network system incorporating an optical transmitter which is controlled in accordance with the above-described wavelength controlling method of JP '092. This system has a star-type network topology. As will be seen from this Figure, the WDM communication network system has optical nodes 401, 402, 403, terminal stations 411, 412, 413, a star coupler 420, and optical fibers 431, 432, 433, 441, 442, and 443. Each optical node 401, 402, 403, has an optical transmitter 451, an optical receiver 452, and an optical branching device 453. To simplify the drawing figure, the components of the optical nodes are only illustrated for node 401. Moreover, although the arrangement for only three terminal stations is shown for the purpose of simplification of illustration, several tens of terminal stations are actually connectable in this network system.

The terminal stations 411, 412, and 413 are respectively joined to the network via the optical nodes 401, 402, and 403, respectively. The optical node 401 is connected to the star coupler 420 both through a transmitting optical fiber 431 and an optical fiber 441 to through which the node 401 receives light. Similarly, the optical nodes 402 and 403, respectively, are connected to the star coupler 420 via transmitting and receiving optical fibers 432, 442 and 433, 443, respectively. The light signals from the respective optical transmitters 451 are sent to the star coupler 420 via the optical fibers 431, 432, 433. The star coupler equally distributes the light from each optical transmitter 451 to all the optical nodes 401, 402, 403 via the optical fibers 441, 442 and 443. In each optical node, the light incident through the receiving optical fiber 441 (or 442 or 443) is split by the optical branching device 453 into two parts which are delivered respectively to the optical transmitter 451 and the optical receiver 452. As a consequence, the tunable optical filters of the optical transmitter and the optical receiver of each terminal station receive the light transmitted from its respective terminal station, together with the light signals transmitted from other terminal stations.

Figure 5:
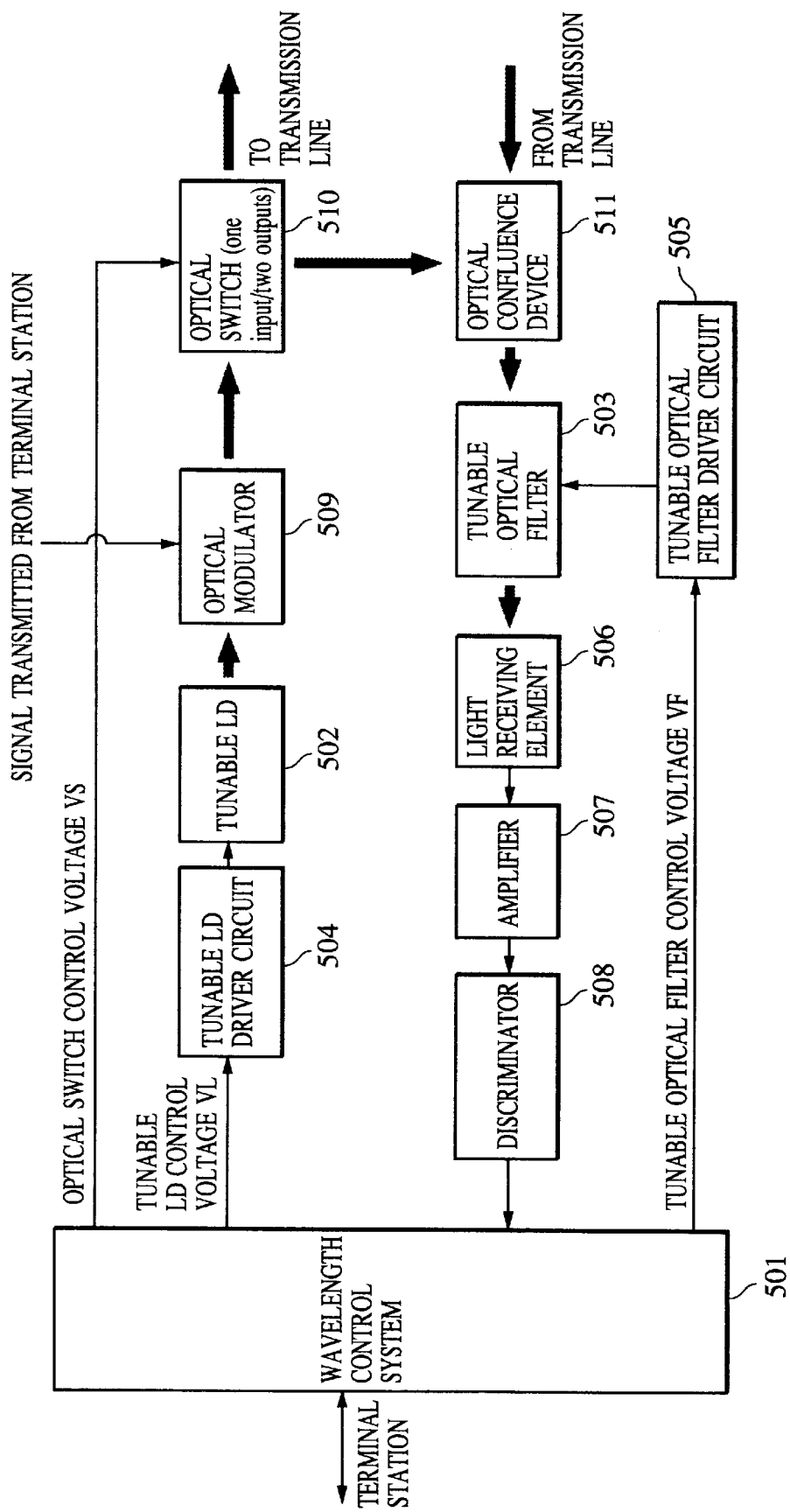
FIG. 5 is an illustration of the construction of a optical transmitter incorporated in an optical node of the WDM network system.

Referring to FIG. 5, the optical transmitter has a wavelength control system 501, a tunable LD 502, a tunable optical filter 503, a tunable LD driver circuit 504, a tunable optical filter driver circuit 505, a light-receiving element 506, an amplifier 507, a discriminator 508, an optical modulator 509, an optical switch 510 and an optical confluence device 511.

The wavelength control system 501 controls the tunable LD driver circuit 504 and the tunable optical filter driver circuit 505 based on a signal outputted from the discriminator 508, thereby performing the control of the wavelength. Operations including starting of the wavelength control are controlled from the terminal station which is connected to the wavelength control system 501. The wavelength control system includes, for example, an arithmetic processing circuit, storage device, an A/D converter, a D/A converter, and so forth. The storage device stores parameters which are used in the wavelength controlling operation, as well as operation sequence program.

The tunable LD 502 may be a DBR-type LD, while a Fabry-Perot tunable optical filter may be used as the tunable optical filter 503. The half amplitude width of the transmissive spectrum of the tunable optical filter 503 is a main factor which determines the channel spacing Δλ. The half amplitude width, therefore, should be determined to be a suitable value which is not greater than the channel spacing Δλ. The wavelength tunable range of the tunable optical filter 503 is greater than the wavelength tunable range of any tunable LD 502 in the network.

The optical modulator 509 performs intensity modulation of the output light from the tunable LD 502 with the transmitted signal. When the modulation is conducted directly with the current injected into the tunable LD 502, chirp over 0.1 nm or so inevitably takes place. Therefore, the described method employs an external intensity modulation system by optical modulator.

The tunable LD driver circuit 504 drives the tunable LD 502, i.e., injects current into the tunable LD 502, such that the wavelength of light emitted from the tunable LD 502 coincides with the wavelength corresponding to the tunable LD control voltage (referred to as VL, hereinafter) derived from the wavelength control system 501.

The tunable optical filter driver circuit 505 drives the tunable optical filter 503 such that the wavelength of transmitted through the tunable optical filter 503 coincides with the wavelength corresponding to the tunable optical filter control voltage (referred to as VF, hereinafter) derived from the wavelength control system 501.

The discriminator 508 has a threshold value which is not greater than the output of the amplifier 507 as obtained when the wavelength of light of each channel coming into the tunable optical filter 503 from the transmission line coincides with the wavelength transmissive through the tunable optical filter 503. For instance, the threshold value is set to the level of the half amplitude of the output from the amplifier 507. The discriminator 508 produces a signal H (digital signal "1") when the level of the input signal is not smaller than the threshold value, otherwise it produces a signal L (digital signal "0").

The optical transmitter 451 associated with each terminal station receives, as a result of the sweeping of the tunable optical filter 503, wavelength-multiplexed light signal including the signal of the wavelength of the associated terminal station, through the receiving optical fiber 441 (or 442 or 443). The optical transmitter then detects the wavelength disposition in the multiplexed light signal and performs the wavelength control operation based on the detected wavelength disposition.

FIGS. 6A through 6E illustrate the wavelength control operation performed in the described network system of JP '092. A series of steps (1) to (5) of operation are performed by the optical transmitter 451 in each of the nodes 401 to 403. Each of the steps (1) to (5) is shown by means of a waveform chart illustrative of the wavelength disposition in which the abscissa indicates the wavelength, while vertical lines show wavelengths provided by the tunable LD 502. Wedge-form regions show the transmission bands of the tunable optical filter 503.

Table 1 below outlines the operations of the tunable optical filter 503 and tunable LD 502 of the optical transmitter, as well the status of the optical switch 510, in each of steps (1) to (5).

STEP (1)
  Detect wavelength disposition
  a) Tunable optical filter: Sweep from minimum wavelength end (λFmin) to maximum wavelength end (λFmax) of wavelength range
  b) Tunable LD: Off
  c) Optical switch: Turned to select optical confluence device STEP (2)
  Set wavelength of tunable LD
  a) Tunable optical filter: Set filter to wavelength λFs which is one of wavelength points spaced Δλ from another wavelength λa1.
  b) Tunable LD: LD is turned on. Sweep from minimum wavelength SLmin till wavelength accords with λFs.
  c) Optical switch: Turned to select optical confluence device.

STEP (3)
  Deliver light to transmission line, while maintaining constant wavelength spacing from adjacent wavelength
  a) Tunable optical filter: Sweep from λL−dλ to λL+Δλ+dλ.
  b) Tunable optical filter: Maintain wavelength spacing Δλ from adjacent wavelength λa1.
  c) Optical switch: Turned to select transmission line.

STEP (4)
  Shift wavelength to longer side, since wavelength spacing has been increased due to extinction of adjacent wavelength
  a) Tunable optical filter: Sweep from λL−dλ to λL+Δλ+dλ.
  b) Tunable LD: Maintain wavelength spacing Δλ from adjacent wavelength λa1.
  c) Optical switch: Turned to select transmission line.

STEP (5)
  Set wavelength of tunable LD.
  a) Tunable optical filter: Sweep from λL−dλ to λL+Δλ+dλ.
  b) Tunable LD: Maintain wavelength spacing Δλ from adjacent wavelength λa2.
  c) Optical switch: Turned to select transmission line.

Figure 6A:
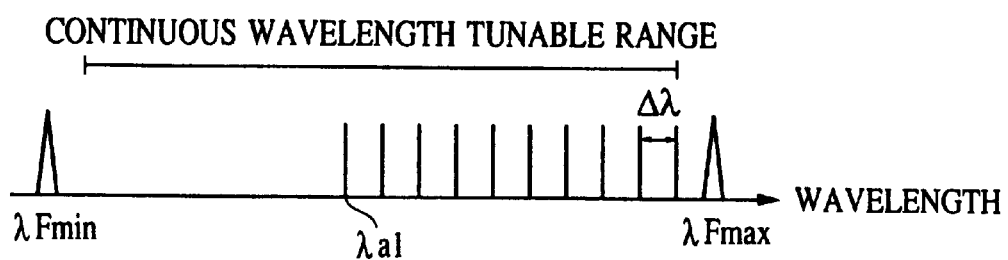
FIGS. 6A through 6E are illustrations of operation of a wavelength controlling method, shown by way of reference example.

More specifically, Step (1) in FIG. 6A shows the operation for detecting the wavelength disposition, performed immediately before the light emission from the optical node which has been instructed by the associated terminal station to transmit data. Sweeping of the transmissive wavelength of the tunable optical filter 503 is performed over the entire range of wavelength tuning, i.e., from the minimum wavelength λFmin to the maximum wavelength λFmax. Meanwhile, the tunable LD 502 is kept off, while the optical switch 510 has been turned to select the optical confluence device 511. As a result of the sweeping, the wavelength control system 501 can grasp the disposition of all wavelengths present on the transmission line. It is therefore understood that the wavelength λa1 is the wavelength which is on the short-wavelength end of the wavelength disposition on the transmission line.

Figure 6B:
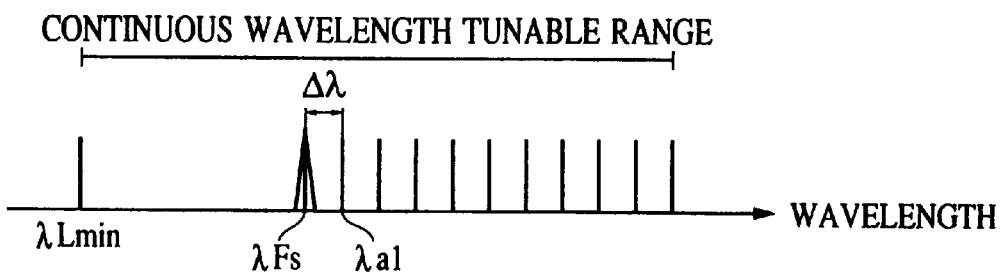

Step (2) shown in FIG. 6B performs, subsequent to Step (1), setting of the wavelength to be transmitted from the tunable LD 502. More specifically, this step sets the wavelength of the tunable optical filter 503 to λFs which is spaced by λΔ from the above-mentioned wavelength λa1. The optical switch 501 remains in the same state as that in Step (1), i.e., it is connected to the optical confluence device 511. In this state, sweeping of the wavelength of the tunable LD 502 is performed, starting from the minimum wavelength λLmin of the wavelength tunable range of the tunable LD 502. Sweeping ceases when the output of the discriminator 508 is turned to "H". Consequently, the wavelength of the light emitted from the tunable LD 502 coincides with the set wavelength λFs of the tunable optical filter 503, and is set to a wavelength position which is on the short-wavelength side of the adjacent wavelength $\lambda a1$ and spaced therefrom by $\Delta\lambda$ which is the intended channel spacing.

Figure 6C:
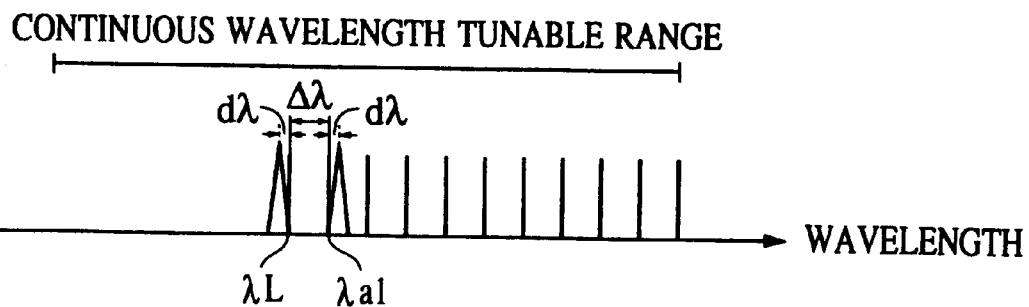

Step (3) shown in FIG. 6C performs, subsequent to Step (2), an operation for maintaining the wavelength spacing. Sweeping of the transmissive wavelength band of the tunable optical filter 503 is performed starting from $(\lambda L-d\lambda)$ to $(\lambda L+\Delta\lambda+d\lambda)$, where $\lambda L$ represents the luminescent wavelength of the tunable LD, while $d\lambda$ is a margin which is preserved to ensure detection of the wavelengths $\lambda L$ and $\lambda a1$ when the channel spacing is held at $\Delta\lambda$. The wavelength $\lambda L$ of the light from the tunable LD 502 is so controlled that the wavelength spacing between the wavelengths $\lambda a1$ and $\lambda L$ as monitored through the sweeping of the wavelength of the tunable optical filter 503 is maintained equal to the above-mentioned channel spacing $\Delta\lambda$. If the wavelength spacing is smaller than the channel spacing $\Delta\lambda$, a control is performed to shift the transmission wavelength $\lambda L$ towards the shortest wavelength end, whereas, if the wavelength spacing is greater than the channel spacing $\Delta\lambda$, a control is performed to shift the same towards the longest wavelength end, thus maintaining the wavelength spacing equal to the channel spacing $\Delta\lambda$. When the wavelength of the tunable LD 502 is set to $\lambda Fs$, the optical switch 510 is turned to select the transmission line, so that the light from the tunable LD 502 is delivered to the transmission line.

Figure 6D:
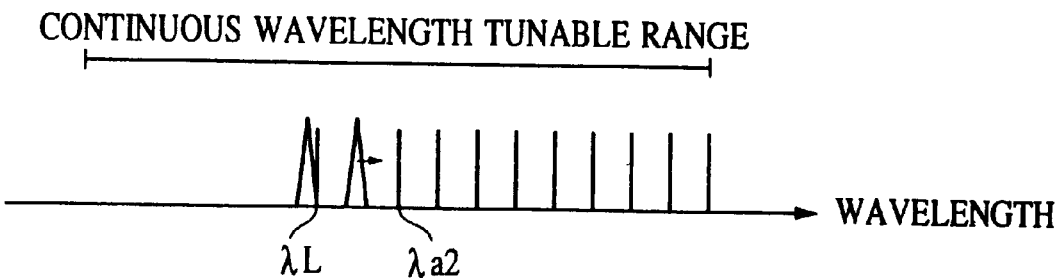

Step (4) shown in FIG. 6D performs a wavelength shifting operation of the tunable LD 502 when the adjacent wavelength $\lambda a1$ is extinguished in the preceding Step (3). The operations and states of the tunable optical filter 503, tunable LD 502, and the optical switch 510 are the same as those in Step (3). Thus, this step (4) repeatedly performs the detection of the. wavelength disposition through the sweeping of the transmissive wavelength band of the tunable optical filter 503 from $(\lambda L-d\lambda)$ to $(\lambda L+\Delta\lambda+d\lambda)$ and subsequent shifting of the transmission wavelength $\lambda L$ of the tunable LD 502 towards the long-wavelength end.

Figure 6E:
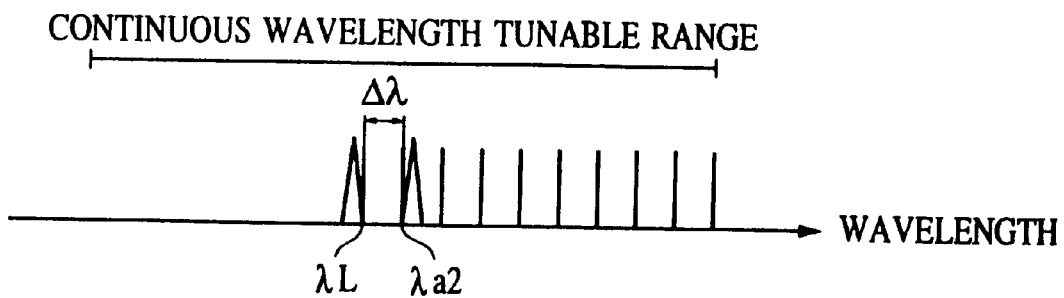

Step (5) shown in FIG. 6E performs an operation for maintaining the wavelength spacing, after the repetition of the operation in Step (4). Sweeping of the transmissive wavelength band of the tunable optical filter 503 from $(\lambda L-d\lambda)$ to $(\lambda L+\Delta\lambda+d\lambda)$ is performed to detect an adjacent wavelength $\lambda a2$, and the shifting of the transmission wavelength $\lambda L$ of the tunable LD 502 is ceased when the adjacent wavelength $\lambda a2$ is detected. Thus, the operation in Step (5) is the same as that in Step (3), except that the adjacent channel has been changed from $\lambda a1$ to $\lambda a2$.

As will be seen from the foregoing description, in the network system shown as a reference example, each sending terminal station performs sweeping to detect any transmission wavelength of another station which may exist on the transmission line, and performs transmission of data by setting its transmission wavelength to the shortest end of the tunable wavelength range. Then, if the transmission from another station which has been executed at a longer transmission wavelength is ceased, the above-mentioned sending station shifts its transmission wavelength to a longer wavelength. The same to shifting operation is performed when the transmission from still another station which has been executed at a longer transmission wavelength is ceased. The transmitted data contains address data identifying the destination. The optical receiver of each station reads, via the light-receiving element, the header portion of the data while performing sweeping of its tunable optical filter at a predetermined time interval, and receives the data when the header portion of the data identifies this station as being the destination station.

Description will now be given of embodiments of the present invention. It is to be noted that features of the embodiments which are the same or equivalent to those in the foregoing description may not be fully described again in the following.

First Embodiment

A first embodiment of the present invention will be described with reference to the drawings. A wavelength multiplex communication network system in accordance with the first embodiment has a construction as shown in FIG. 4. Each of the optical nodes incorporated in the system has a construction shown by the block diagram in FIG. 5. The operation and function of the blocks are not described in order to eliminate duplication of explanation.

Figure 1:
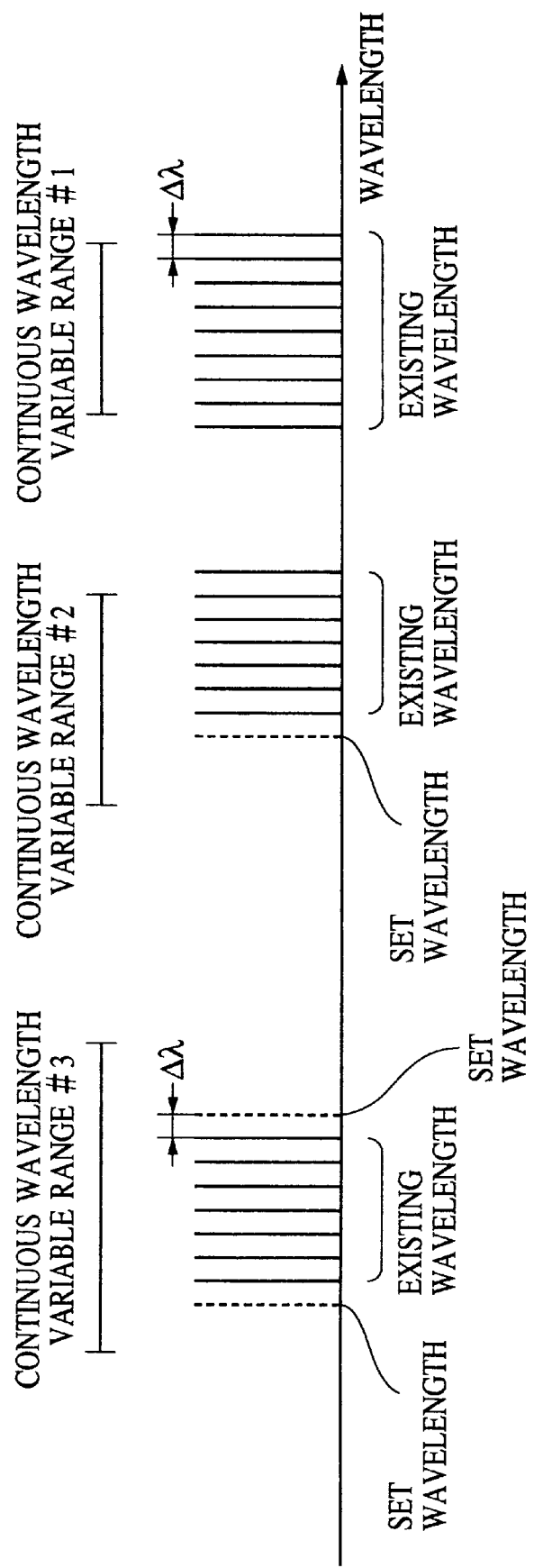
FIG. 1 is an illustration of wavelength disposition along a transmission line under a wavelength control method of the present invention.

FIG. 1 is a chart showing wavelength disposition illustrative of the wavelength control in accordance with the present invention. Wavelength is measured along the abscissa. Vertical lines indicate wavelengths of light signals from operating tunable LDs 502. Horizontal lines above these vertical lines show the continuous wavelength tunable ranges of the tunable LD 502 in the optical node which will be specifically mentioned in the following description of the wavelength control in accordance with the present invention. This optical node, therefore, will be referred to as the "subject optical node". In the illustrated case, there are three continuous wavelength tunable ranges #1, #2, and #3. There are two types of vertical lines: solid vertical lines indicative of the wavelengths which have been excited and present on the transmission line in advance of the start of light emission from the subject optical node, referred to as "existing wavelengths"; and broken vertical lines indicative of candidate set wavelengths to which the transmission wavelength from the subject optical node can to be set in accordance with the wavelength control method of the present invention.

FIGS. 2A–2D illustrate the operation of the first embodiment of the wavelength control method of the present invention. Before the optical transmitter associated with the subject optical node is commenced, a process is executed for the purpose of setting the transmission wavelength of the tunable LD 502, including four steps (I) to (IV), shown in FIGS. 2A–2D, respectively. These steps (I) to (IV) have reference to Steps (1) and (2) of the operation performed in the network system of JP '092, described before in connection with FIG. 6. Steps I–IV are outlined in Table 2 below.

Step (I)
Detect wavelength disposition
a) Tunable optical filter: Sweep from minimum wavelength end $\lambda Fmin$ to maximum wavelength end $\lambda Fmax$ of wavelength range.
b) Tunable LD: off Step (II)
Set wavelength of tunable LD
a) Tunable optical filter: Set filter to wavelength $\lambda fs1$ which is one of wavelength points spaced $\Delta\lambda$ from another wavelength $\lambda a1$.
b) Tunable LD: LD is turned on. Sweep from minimum to wavelength $\lambda Lmin$ till wavelength accords with $\lambda Fs1$ or till $\lambda Lmax$ is reached.

Step (III)
Set wavelength of tunable LD
a) Tunable optical filter: Set filter to wavelength $\lambda Fs2$ which is one of wavelength points spaced $\Delta\lambda$ from another wavelength $\lambda a2$.
b) Tunable LD: LD is turned on. Sweep from minimum wavelength $\lambda Lmin$ till wavelength accords with $\lambda Fs2$ or till $\lambda Lmax$ is reached.

Step (IV)

Set wavelength of tunable LD a) Tunable optical filter: Set filter to wavelength λFs3 which is one of wavelength points spaced Δλ from another wavelength λa3.

b) Tunable LD: LD is turned on. Sweep from minimum wavelength λLmin till wavelength accords with λFs3 or till λLmax is reached.

Figure 2A:
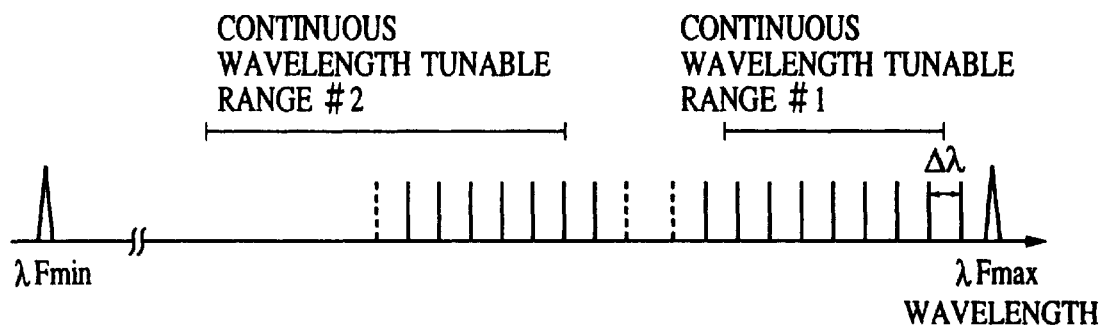
FIGS. 2A through 2D are illustrations of the operation of a first embodiment of the wavelength controlling method in accordance with the present invention.

FIG. 2A shows wavelength disposition on a wavelength multiplex transmission line, with the distance along the abscissa indicating spread of wavelength. For the purpose of simplification of the drawings, FIG. 2A shows an enlarged part of FIG. 1; that is, only the continuous wavelength tunable ranges #1 and #2, among the three ranges #1 to #3 available on the tunable LD 502, are shown. Solid vertical lines show the existing wavelengths, while broken vertical lines show the candidate wavelengths. Wedge-shaped region λFmax represents the longest transmissive wavelength of the is tunable optical filter 503, while λFmin represents the shortest transmissive wavelength of the same. Also shown are the operations or states of the tunable optical filter 503 and tunable LD 502 of the optical transmitter in each of the steps (I) to (IV) of FIGS. 2A–2D, respectively. The state of the optical switch 510 is not specifically shown in FIGS. 2A–2D, because the optical switch 510 constantly selects the optical confluence device 510 throughout the steps (I) to (IV).

In FIGS. 2A–2D, Δλ indicates the channel spacing to be maintained under the wavelength control of the invention, λLmin indicates the shortest wavelength in the wavelength tunable range available on the tunable LD 502 of the optical transmitter in the subject optical node, λL indicates the transmission wavelength under the control, λFmin and λFmax respectively indicate the shortest and longest wavelengths of the wavelength tunable range of the tunable optical filter 503, λFs1, λFs2 and λFs3 respectively indicate the wavelengths of the tunable optical filter 503 as obtained in the course of setting of the wavelength of the tunable LD 502, and 6a1, λa2, and λa3 respectively indicate adjacent wavelengths which are mentioned in the following description as being reference wavelengths from which the transmission wavelength to be obtained has to be spaced in order to avoid interference.

The tunable LD 502 of the optical transmitter used in the present invention has a certain wavelength tunable range which contains a plurality of discrete continuous wavelength tunable ranges. Only three, i.e., #1, #2, and #3, of these discrete continuous wavelength tunable ranges are shown in FIG. 1. According to the present invention, the wavelength control is performed so as to set the transmission wavelength of the tunable LD 502 such that the transmission wavelength coincides with one of the candidate wavelengths each of which is within any one of the continuous wavelength tunable ranges #1 to #3 and is spaced by the required channel spacing Δλ from any existing wavelength which is on one end of any group of existing wavelengths (solid vertical lines) in the illustrated wavelength disposition. Referring to FIG. 1, there is no such candidate wavelength in the continuous wavelength tunable range #1. The single broken vertical line in the range #2 and a couple of broken vertical lines in the range #3 are the candidate wavelengths. The transmission of the light from the tunable LD 502 is conducted at a wavelength which coincides with one of these candidate wavelengths. The operation for setting the transmission wavelength will be more fully described with reference to FIGS. 2A–2D.

It is assumed here that, in this embodiment, the characteristic of the tunable LD 502 in terms of the current injected into the LD and the wavelength of light emitted therefrom has not been stored in the wavelength control system 501 of the optical transmitter. The wavelength control system 501 detects the wavelength disposition of the existing wavelengths, through sweeping of the wavelength of the tunable optical filter 503, in order to find a wavelength which is within any one of the continuous wavelength tunable ranges and which is spaced by the required channel spacing Δλ from any existing wavelength on one end of any group of existing wavelengths.

Referring to FIG. 2A, Step (I) conducts detection of the wavelength disposition on the optical fiber transmission line of the network system. The transmissive wavelength range of the tunable optical filter 502 is swept from λFmin to λFmax, thereby detecting disposition of existing wavelengths. Wavelengths indicated by broken vertical lines are located as the candidates of the transmission wavelength to be set, based on the wavelength spacing described above.

Figure 2B:
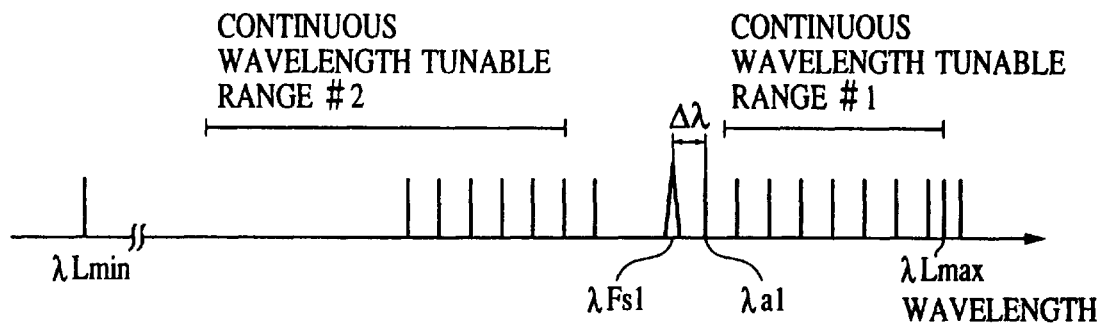

Subsequently, Step (II), shown in FIG. 2B, conducts first cycle of a wavelength setting operation for setting the wavelength of the tunable LD 502. In this operation, the wavelength of the tunable optical filter 503 is set to the longest wavelength λFs1 from among the candidate wavelengths, and the luminescent wavelength of the tunable LD 502 is swept from λLmin to λFs1. In the illustrated case, the wavelength Fs1 is between the continuous wavelength tunable range #1 and the continuous wavelength tunable range #2, so that the wavelength of the tunable LD 502 never coincides with the wavelength Fs1, despite the sweeping up to the wavelength λLmax. Thus, the first cycle of operation for setting the wavelength of the tunable LD 502 fails to hit.

Figure 2C:
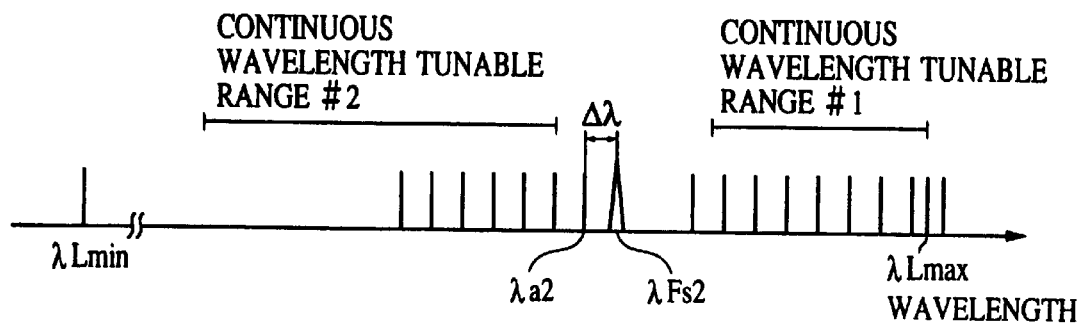
Figure 2D:
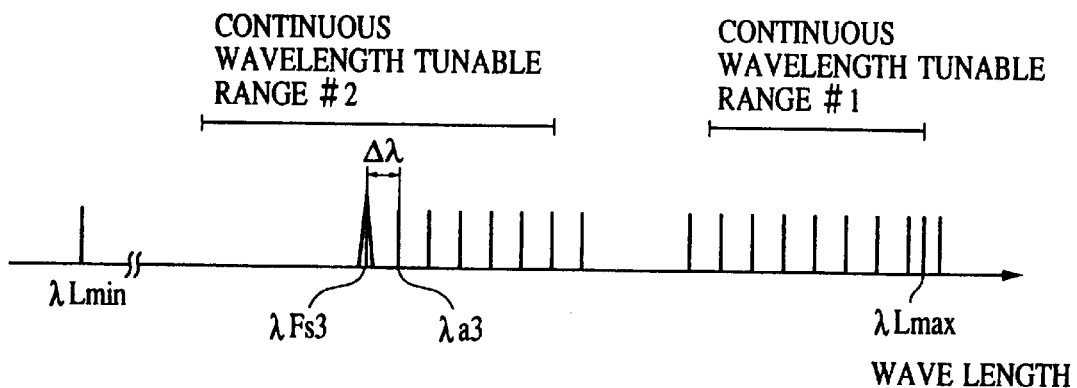

Step (III), shown in FIG. 2C, performs a second cycle of the operation for setting the wavelength of the tunable LD 502. This operation is substantially the same as that in Step (II) except that the wavelength of the tunable optical filter 503 is set to the candidate wavelength λFs2 which is second to the longest. In this case, since the wavelength λFs2 is between the continuous wavelength tunable range #1 and the continuous wavelength tunable range #2, so that the wavelength of the tunable in LD 502 never coincides with the wavelength Fs2, despite the sweeping up to the wavelength λLmax. Thus, the second cycle of the operation for setting the wavelength of the tunable LD 502 also fails to hit.

Subsequently, Step (IV) performs a third cycle of the operation for setting the wavelength of the tunable LD 502. This operation is substantially the same as that in Step (II) except that the wavelength of the tunable optical filter 503 is set to the candidate wavelength λFs3 which is third to the longest. In this case, the wavelength λFs3 falls within the continuous wavelength tunable range #2. Therefore, when the wavelength of the light emitted from the tunable LD 502 coincides with λFs3 during the sweeping of the wavelength of the tunable LD 502, the tunable optical filter 502 passes this light of the wavelength λFs3 to the light-receiving element 506. Consequently, the output from the light-receiving element 506 exceeds the threshold level of the discriminator 508, thus confirming that the wavelength of the light from the tunable LD 502 has coincided with the candidate wavelength λFs3. The luminescent wavelength of the tunable LD 502, therefore, is set to λLs3.

After the luminescent wavelength of the tunable LD 502 has been set to a wavelength which is spaced λΔ from an end of a group of existing wavelengths, i.e., to the wavelength λFs3 in the illustrated case, the optical switch 510 is turned to select the transmission line, and an operation for maintaining the wavelength spacing from the adjacent wavelength is conducted in the same manner as that in the network system described before as a reference.

It will be understood that, although in the illustrated case the luminescent wavelength of the tunable LD 502 is set in the third cycle of the setting operation, this is only illustrative and the setting may be done in the first or second cycle, or fourth or further cycle, of the setting operation, depending on the wavelength disposition and the disposition of the continuous wavelength tunable ranges.

The described embodiment of the present invention permits the use of a tunable LD having a wavelength tunable range which is as wide as several tens of nm, although this range contains discontinuities, thus making it possible to implement a wavelength division to multiplexing communication network having a greater number of wavelength multiplexing.

One advantage of the described embodiment is that the wavelength characteristic of the tunable LD 502 need not be adjusted when fabricating an optical transmitter or when replacing a tunable LD 502.

Second Embodiment

A second embodiment of the present invention will now be described with reference to the drawings.

Figure 3A:
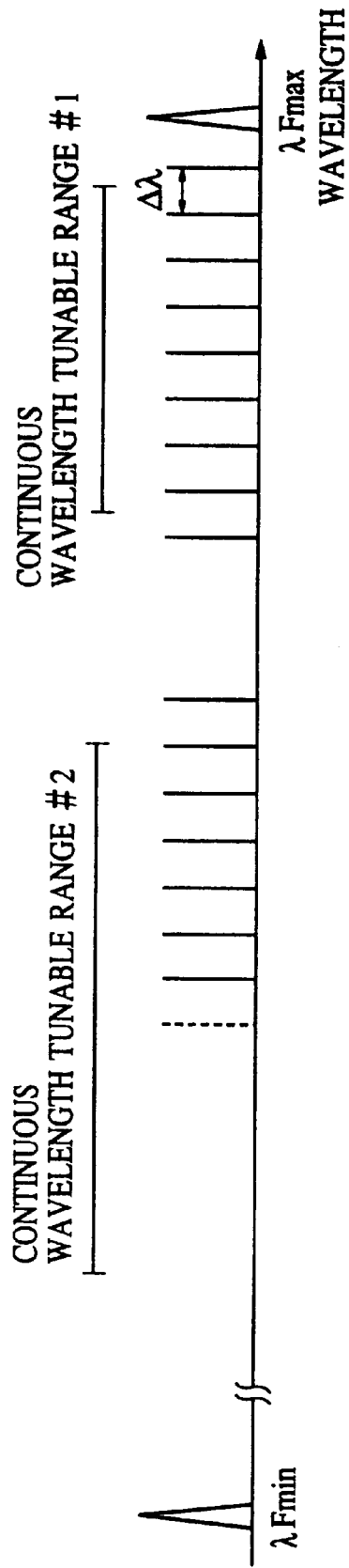
FIGS. 3A and 3B are illustrations of the operation of a second embodiment of the wavelength controlling method in accordance with the present invention.
Figure 3B:
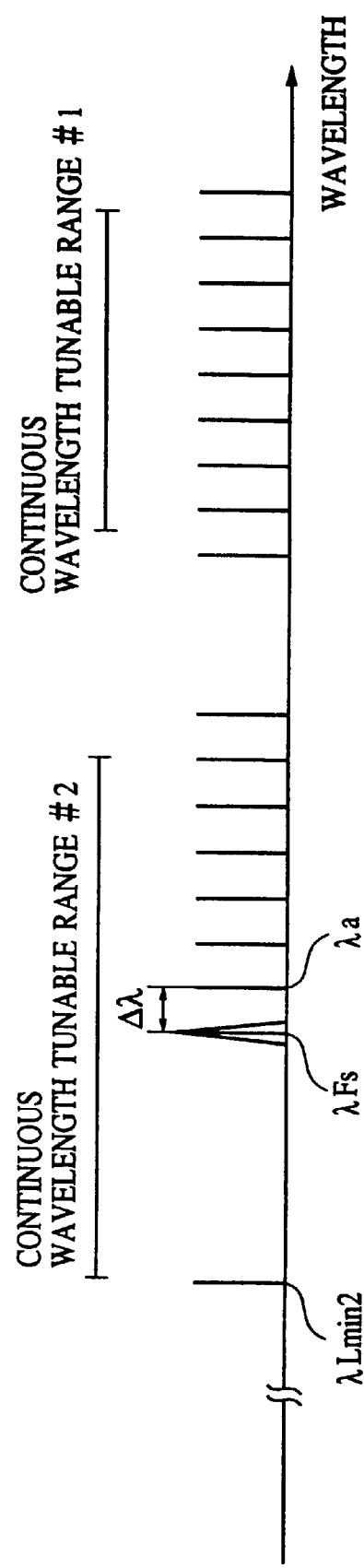

FIGS. 3A and 3B are illustrations of the operation of the second embodiment of the wavelength control method in accordance with the present invention. These Figures show steps which correspond to the steps of the first embodiment described before in connection with FIGS. 2A–2D. Thus, symbols appearing in this Figure represent the same things as those in FIGS. 2A–2D. More specifically, FIGS. 3A and 3B show a series of Steps (i) and (ii) for setting the luminescent wavelength of the tunable LD.

Step (i)
  Detect wavelength disposition
  a) Tunable optical filter: Sweep from minimum wavelength end λFmin to maximum wavelength end λFmax of wavelength range.
  b) Tunable LD: off
Step (ii)
  Set wavelength of tunable LD
  a) Tunable optical filter: Set filter to wavelength λFs which is one of wavelength points spaced Δλ from another wavelength λa.
  b) Tunable LD: LD is turned on. Sweep from minimum wavelength λLmin2 of continuous wavelength tunable range #2 till wavelength accords with λFs.

In this second embodiment, the wavelength control system 501 of the optical transmitter stores beforehand the relationship between the electrical current injected to the tunable LD 502 and the wavelength of the light emitted therefrom, as well as the relationship between the voltage applied to the tunable optical filter 503 and the wavelength selected by this filter. It is also to be understood that the second embodiment only requires determining in which one of the plurality of discrete continuous wavelength tunable ranges the wavelength which does not interfere with other wavelength is contained or, in which discrete continuous wavelength tunable ranges the wavelengths which do not interfere with other wavelength are contained. In this embodiment, therefore, any error on the order of Δλ in the relationships between the wavelengths and the control variables is permissible. Thus, in this second embodiment, a wavelength is looked for which falls within any one of the continuous wavelength tunable ranges and which is spaced Δλ from a wavelength which is on one end of a group of existing wavelengths, in a manner which will now be described with reference to FIGS. 3A and 3B.

Referring to FIG. 3A, Step (i) performs detection of the wavelength disposition. More specifically, the transmissive wavelength of the tunable optical filter 503 is swept over a range from λFmin to λFmax, whereby the disposition of existing wavelengths on the transmission line is detected. Then, candidate wavelengths for emission from the tunable LD 502 are searched for within the continuous wavelength tunable ranges, based on the transmissive wavelength characteristic of the tunable optical filter 503 and the luminescent wavelength characteristic of the tunable LD 502. As a result, the wavelength indicated by broken vertical line is determined as the set wavelength.

Subsequently, Step (ii) shown in FIG. 3B executes an operation for setting the luminescent wavelength of the tunable LD 502. This operation is preceded by setting the transmissive wavelength of the tunable optical filter 503 to the above-mentioned set wavelength which is indicated by λFs. Then, the luminescent wavelength of the tunable LD 502 is swept starting from λLmin2, until coincidence with the wavelength λFs is obtained. Consequently, the tunable LD 502 is set to illuminate at the set wavelength which is on the short-wavelength side of the group of existing wavelengths and which is spaced by the required channel spacing Δλ from the existing wavelength which is at the short-wavelength end of the group of existing wavelengths.

As will be understood from the foregoing description, according to the second embodiment of the present invention, it is possible to set the luminescent wavelength of the tunable LD 502 only by one cycle of the wavelength setting operation, with the result that the time required for the wavelength setting operation is shortened, by virtue of the fact that the wavelength characteristics of the tunable LD 502 and the tunable optical filter 503 are stored in the wavelength control system 501.

Modifications

The first and second embodiments as described are not exclusive and may be modified provided that the luminescent wavelength of the tunable LD can be performed equally well.

For instance, although in the first embodiment a plurality of cycles of the wavelength setting operation are executed as required after the single cycle of wavelength disposition detecting operation, the wavelength control method of the present invention may be carried out in such a manner that each cycle of wavelength setting operation is necessarily preceded by the wavelength disposition detecting operation.

It is also possible to conduct the examination of the candidate wavelengths for the purpose of setting of the luminescent wavelength, starting from the shortest one or any suitable one of the candidate wavelengths, although in the described first embodiment the longest one of the candidate wavelengths is examined first.

The described construction of the optical transmitter, as well as the constructions of other components of the system, also is illustrative.

For instance, the control of the luminescent wavelength of the tunable LD 502 may be performed by controlling the temperature of the semiconductor laser element of the tunable LD 502, instead of controlling the electrical current injected by an tunable LD driver circuit 504 as done in the described embodiments.

It is also possible to use a filter of a type other than Fabry-Perot resonator type, as the tunable optical filter 503. The described external intensity modulation may be substituted by other suitable modulation method. For instance, a direct intensity modulation which directly modulates the tunable laser diode may be used, provided that no chirping takes place. It is also possible to directly apply an FSK (Frequency Shift Keying) technique. Direct polarization modulation method also can be adopted, using a device of the type described in Applied Physics Letters, Vol. 67, No. 23, 1995, "Polarization switching in AlGaAs/GaAs distributed feedback lasers between the stable single longitudinal modes".

Third Embodiment

The embodiments and modifications described above employ such a system arrangement that the tunable optical filter serving as the detecting means for the purpose of wavelength control is provided in each of the optical nodes. In the third embodiment which will now be described, the detecting means is not provided in individual optical nodes.

Figure 7:
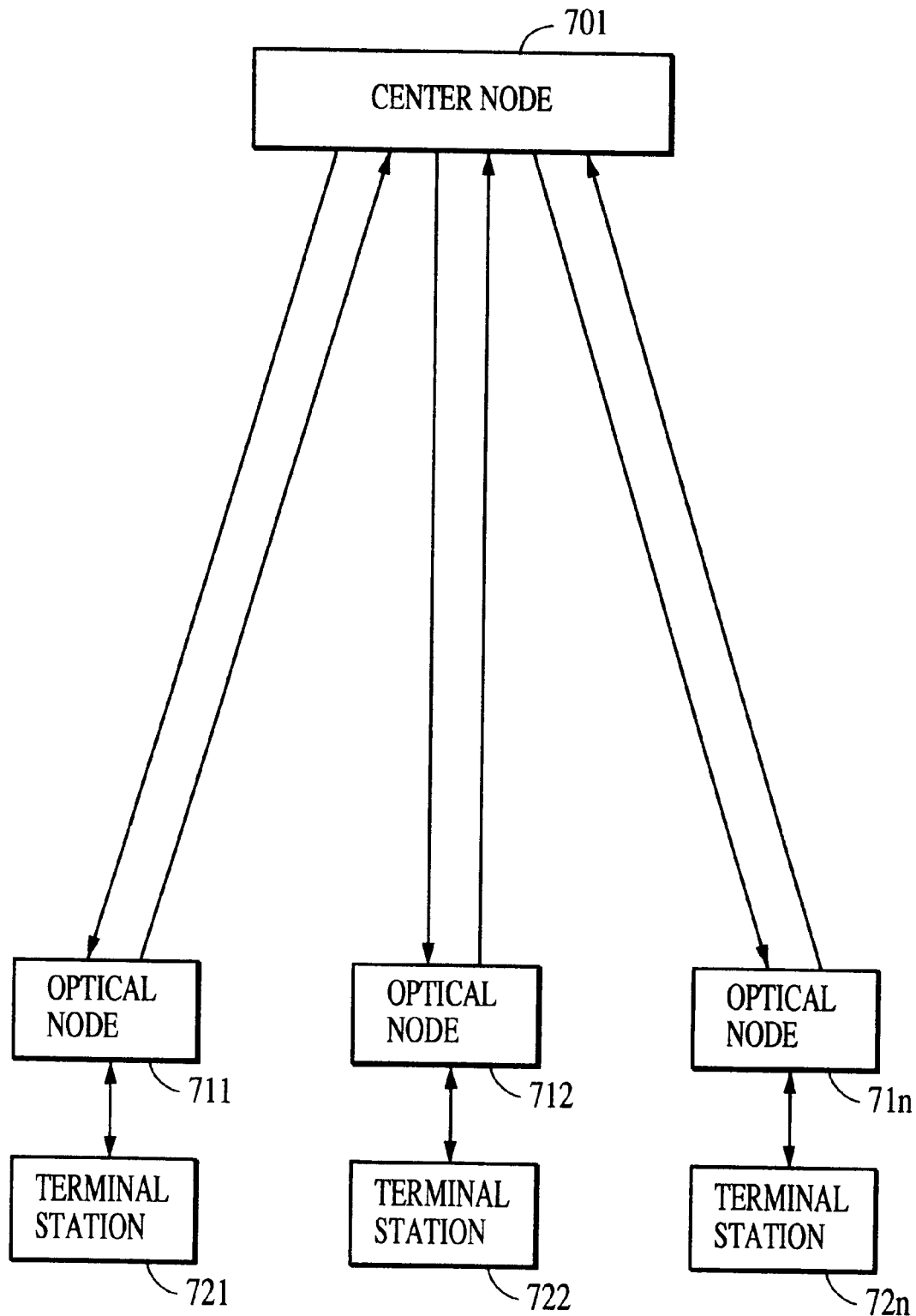
FIG. 7 is an illustration of operation of a second embodiment of the wavelength controlling method in accordance with a third embodiment of the present to invention.

Referring to FIG. 7 showing the network structure of this embodiment, a center node 701 is used in place of the star coupler incorporated in the preceding embodiments. Optical nodes 711, 712, ..., 71n, it associated with terminal stations 721, 722, ..., 72n, respectively, are connected to the center node 701. In contrast to the preceding embodiments in which the detecting means for the wavelength control are provided in respective optical nodes, the third embodiment has a common detecting means provided in the center node. The detecting means in the center node produces wavelength control information. Based on such wavelength control information, the wavelength control is performed through mutual communication between the center node and each optical node. It is to be understood that the third embodiment conducts wavelength multiplexing of two types of communication: (1) the wavelength division multiplexing communication of the type performed in each of the preceding embodiments, and (2) the communication for exchanging the wavelength control information between the optical nodes and the center node.

Figure 8:
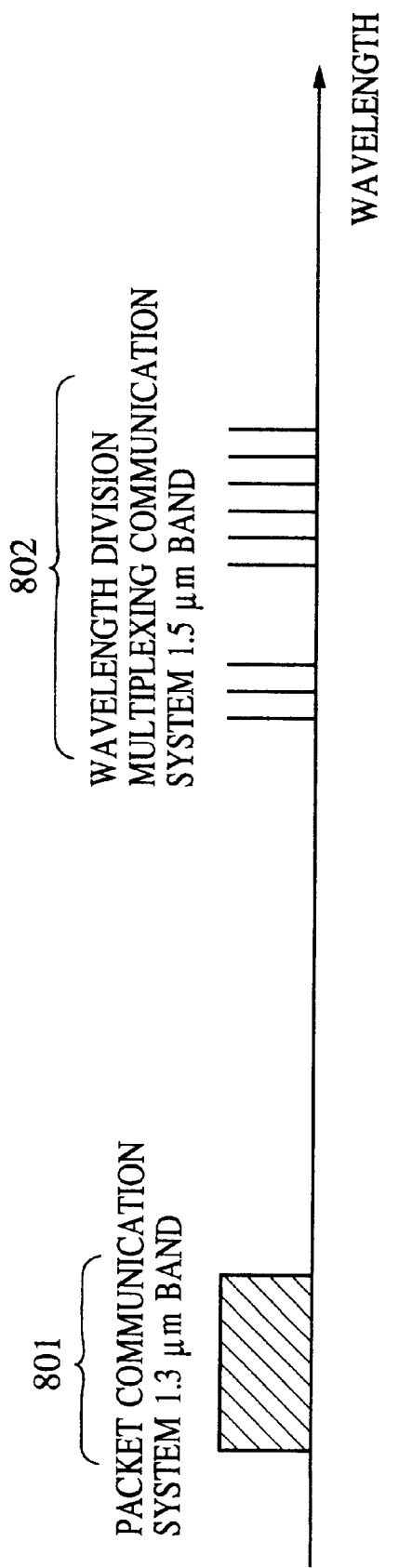
FIG. 8 is an illustration of wavelength disposition in accordance with the third embodiment, shown by way of example.

FIG. 8 illustrates wavelength disposition under such wavelength division multiplexing of the two types of communication. A group of wavelengths collectively denoted by 802 corresponds to the wavelength division multiplexing communication of the type performed in the preceding embodiments. A high-density wavelength division multiplexing is conducted by using 1.5 µm band. Meanwhile, 801 denotes a wavelength region for packet communication of the wavelength control information. A 1.3 µm-wave band is allocated for this purpose. This wavelength region for packet communication is commonly used by all the optical nodes, for the purpose of mutual communication between the optical nodes and the center node, executed by using a known technique such as CSMA/CD. To this end, the wavelength control means in the center node and the optical nodes connected to the center node have means which enable packet communication between the center node and the optical nodes.

Figure 9:
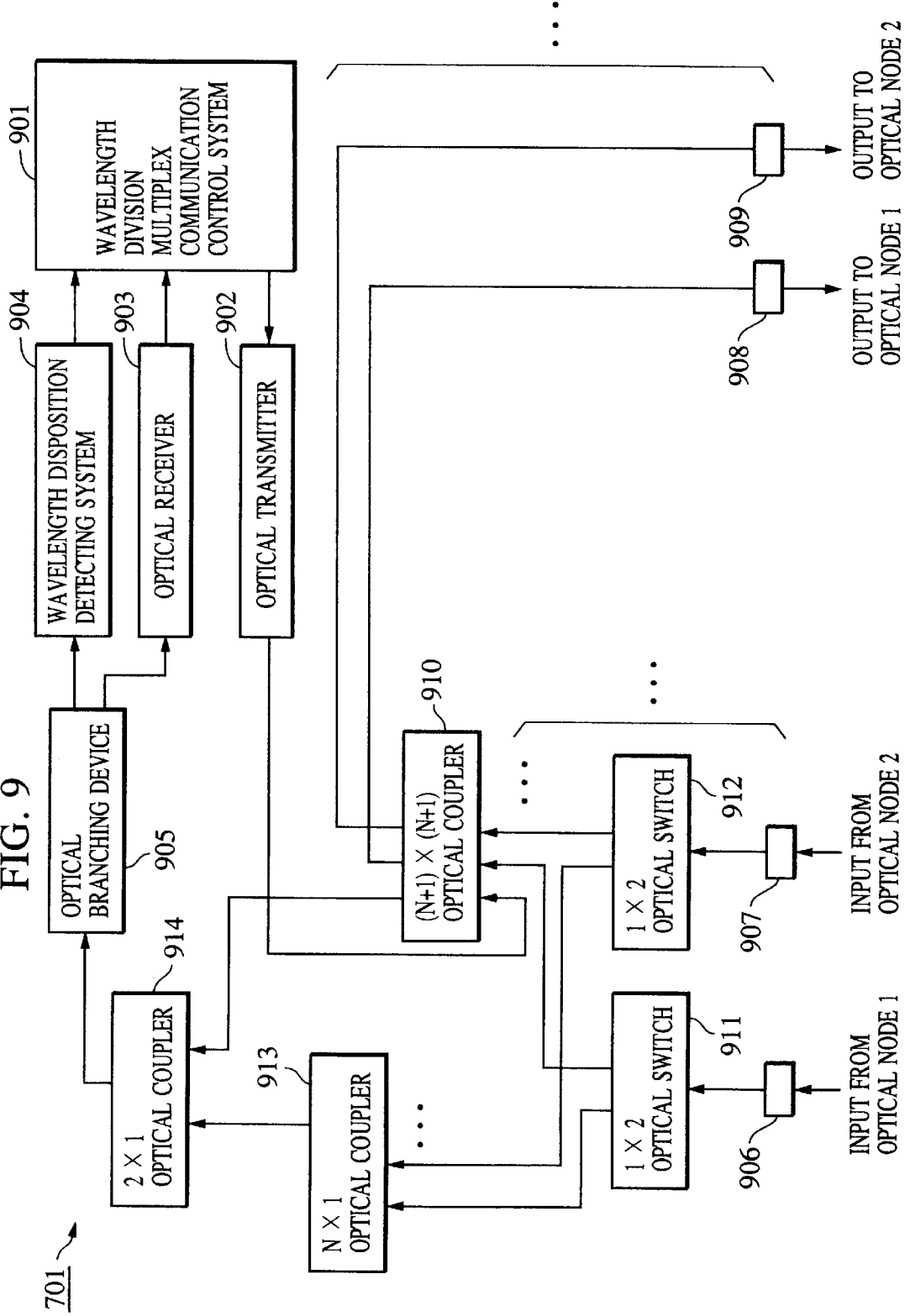
FIG. 9 is an illustration of the construction of a center node incorporated in the third embodiment of the present invention.

FIG. 9 shows the construction of the center node 701. As stated before, detecting means used for the purpose of wavelength control is provided in the center node. Thus, the detection of wavelength is performed in the center node and is transmitted from there to each optical node. Numeral 901 denotes a wavelength division multiplexing communication control system for processing the wavelength control information. Numerals 902 and 903 respectively denote an optical transmitter and an optical receiver which transmits and receives signals in the packet communication system. Numeral 904 denotes a wavelength detection system for detecting the wavelength disposition in the wavelength division multiplexing communication system. An optical branching device 905 is operative to separate the wavelength of the light signal by of the wavelength multiplex communication control system and the wavelength of the light in the packet communication system from each other, and to deliver the light of the wavelength multiplex communication control system and the light of the packet communication system to the wavelength disposition detecting system 904 and the optical receiver 903, respectively. Numerals 906 and 907 denote input ports to which are connected the optical nodes through the transmission line, while 908 and 909 denote output ports to which also are connected to the optical nodes through the transmission line. The light inputted from one of the input ports is distributed to the output ports through a optical-coupler 910 having (N+1) input terminals and (N+1) output terminals. Numerals 911 and 912 denote optical switches, each being capable of selecting one of two states: namely, a state in which it passes the light from the input port to the optical-coupler 910 so as to allow the light to be distributed to the output ports, and a state in which it blocks the input light so as to prohibit the distribution of the light to the output ports. The optical switch used in this embodiment is of a light-path change-over type and is operative in such a manner that, when it does not pass the input light to the optical-coupler 910, it delivers the light to the optical-coupler 913, whereas, when it does not pass the input light to the optical-coupler 913, it delivers the light to the optical-coupler 910. The light input through the optical-coupler 913, optical-coupler 914, and the optical branching device 905 is led to the wavelength disposition detecting system 904 or the optical receiver 903. As stated before, the optical switch used in this embodiment is of the light-path change-over type. Therefore, in order that the output from the optical switch is received also by the wavelength disposition detecting system even when the same output is being led to the optical-coupler 910, one of the outputs of the optical-coupler 910 is led to the optical branching device 905 via the optical-coupler 914. Furthermore, the output from the optical transmitter 902 is led to one of the input terminals of the optical-coupler 910 so that it can reach the optical node.

The third embodiment is basically the same as the preceding embodiments insofar as it performs the wavelength control based on the result of detection of the wavelength of light emission from the optical node. The third embodiment, however, is different from the preceding embodiments in that the mutual exchange of the wavelength control information is conducted through the packet communication system. More specifically, when an optical node demands signal transmission, such a transmission demand is sent to the wavelength division multiplexing communication control system 901 of the center node. In response to the transmission demand, the wavelength disposition detecting system 904 of the wavelength division multiplexing communication control system 901 performs the wavelength detecting operation, so as to find a wavelength which does not interfere with other wavelengths. When wavelength tunable ranges of the respective light-emitting means have been known as in the second embodiment, the detecting means of the wavelength disposition detecting means is set to be able to detect light of a wavelength which falls with any one of the continuous wavelength tunable ranges and which does not interfere with other wavelengths. The wavelength multiplex communication control system 901 then delivers to the optical node demanding the transmission an instruction to perform sweeping of the wavelength of the optical node. After the output light from the light-emitting means has been detected by the detecting means, a control is performed to preserve the predetermined spacing from the adjacent wavelength, as in the second embodiment. Namely, when the spacing from the adjacent wavelength has become too small, an instruction for shifting the luminescent wavelength in a direction to increase the spacing is given through the packet communication system. When the wavelength tunable ranges of the light-emitting means of the respective optical nodes are unknown, the wavelength control may be executed in the same way as that in the first embodiment.

It will be clear that the third embodiment as described effectively reduces costs because it does not require installation of the detecting means in all the optical nodes.

As will be understood from the foregoing description, according to the present invention, it is possible to increase the degree of wavelength multiplexing in a wavelength division multiplexing communication network, by making a full use of overall discontinuous wavelength tunable range of a tunable LD in which a plurality of discrete continuous wavelength tunable ranges exist. This means that the communications. efficiency can markedly improve using a tunable LD having an overall wavelength tunable range which is wide but includes discontinuities.

In addition, when the plurality of discrete continuous wavelength tunable ranges of the tunable LD are not known, the luminescent wavelength of the tunable LD is set to one of the candidate wavelengths which are adjacent to existing wavelengths on the transmission line, through setting of the transmissive wavelength of a tunable optical filter to successive one of the candidate wavelengths. It is therefore possible to densely arrange a plurality of transmission channels, while preserving the required channel spacing $\Delta\lambda$ between the adjacent channels, with an inexpensive arrangement which does not require any storage means for storing information to be used in the wavelength control system.

In addition, when a plurality of continuous wavelength tunable ranges are known in advance to be the existing wavelengths, a candidate wavelength to which the luminescent wavelength of the optical transmitter is to be set can be detected quickly, so setting of the luminescent wavelength to such a wavelength can be achieved quickly, thus enabling faster data communication.

What is claimed is:

1. A method of controlling a wavelength of emitted light in a network system having a light transmission line for transmitting light, light emitting means having a plurality of discrete continuous-wavelength-tunable ranges and emitting the light to the light transmission line, and detecting means for detecting light on the light transmission line, said method comprising the steps of:

detecting, by the detecting means, a wavelength of light within one of the plurality of continuous wavelength-tunable ranges of the-light-emitting means that is non-interfering with any wavelengths of light present on the light transmission line; and emitting light from the light-emitting means to the light transmission line at the wavelength detected in said detecting step to be non-interfering with the wavelengths of light present on the light transmission line.

2. A method according to claim 1, wherein said detecting step comprises:

searching a usable wavelength of light present on the light transmission;

a first step of selecting one wavelength within the range which can be detected by the detecting means and does not interfere with the usable wavelength, and setting the wavelength detected by said detecting means at the above selected wavelength;

a second step of discriminating whether said detecting means detects said outputted light by changing the wavelength of the output light from said emitting means; and a step of repeating said first and second steps in case said detecting means does not detect said outputted light.

3. A method according to claim 2, wherein, after said first step is carried out, the wavelength once selected is not selected in case the first step is carried out again.

4. A method according to claim 1, said detecting step comprising:

identifying using the detecting means, a wavelength which is non-interfering with any wavelength of light present on the light transmission line; and discriminating whether the identified wavelength falls within one of the continuous-wavelength-tunable ranges, which have been stored, of the light-emitting means.

5. A method according to claim 1, further comprising the step of:

to controlling, after said emitting step, the wavelength of the light so that said wavelength is one of spaced apart a predetermined amount from an adjacent wavelength and maintained at an end of the continuous-wavelength-tunable range.

6. A method according to claim 1, further comprising the step of prohibiting said emitting step until the wavelength of the light from the light-emitting means is set not to interfere with other light.

7. A method according to claim 6, said prohibiting step prohibiting said emitting step to a part of the transmitting line.

8. A method according to claim 1, wherein said detecting step comprises:

searching for a usable wavelength of light present on the light transmission line;

a step of controlling said detecting means so that a first selected light can be detected, which is within the range that can be detected by the detecting means and does not interfere with the usable wavelength; and a step of discriminating whether said detecting means detects said first detected light by changing the wavelength of the output light from said emitting means.

9. A method according to claim 8, comprising:

a second controlling step of controlling said detecting means so that a second selected light can be detected, which is within the range that can be detected by the detecting means and does not interfere with the usable wavelength, in case the first selected light cannot be detected; and a second discriminating step of discriminating whether said detecting means detects said second detected light by changing the wavelength of the output light from said emitting means.

10. A method according to claim 9, wherein said second controlling step and said second discriminating step are repeated until said second selected light is detected.

11. A method according to claim 1, wherein said emitting means is a wavelength tunable laser.

12. A method according to claim 1 wherein said detecting means is a wavelength tunable filter.

13. A method according to claim 1, wherein said step of searching for a usable wavelength includes a step of sweeping from a longest to a shortest of the transmission wavelengths of said wavelength tunable filter.

14. A method according to claim 13, wherein the step of controlling said detecting means includes controlling the wavelength tunable filter so that the first selected light can be detected.

15. A network system, comprising:

a light transmission line along which light is transmitted;

light-emitting means tunable to a wavelength within a plurality of discrete continuous-wavelength-tunable ranges, for emitting output light at a wavelength to said light transmission line;

detecting means for detecting a wavelength within one of the plurality of continuous-wavelength tunable ranges of said light-emitting means which is non-interfering with any other light present on said light transmission line; and control means for controlling the wavelength of light emitted from said light emitting means to be the wavelength detected by said detecting means.

16. A network system according to claim 15, wherein said light-emitting means and said detecting means are in an optical node connected to the light transmission line.

17. A network system according to claim 16, said optical node further comprising output controlling means for controlling operation between a mode in which the output light from said light-emitting means is emitted to said light transmission line and a mode in which the output light from said light-emitting means is not emitted to said light transmission line.

18. A network system according to claim 15, further comprising an optical coupler having a plurality of output ports, said light transmission line comprising a plurality of transmission sub-lines which are connected through said optical coupler which delivers light inputted through any one or more input port to the plurality of output ports.

19. A network system according to claim 18, further comprising a control node, said control node including said optical coupler, said detecting means, and said control node further comprising output controlling means for controlling the control node to operate in one of a mode in which the output light from said light-emitting means is connected to said plurality output ports of said optical coupler and a mode in which the output light from said light emitting means is not connected to said plurality of output ports of said optical coupler.

20. A network system according to claim 18, wherein said optical coupler couples said light-emitting means with said detecting means.

21. A network system according to claim 18, further comprising output controlling means for controlling between a mode in which the output light from said light-emitting means is delivered to said plurality of output ports of said optical coupler and a mode in which the output light from said light-emitting means is not delivered to said plurality of output ports of said optical coupler.

22. A network system according to claim 15, wherein said detecting means comprises a tunable optical filter for controlling the wavelength to be selected.

23. A network system according to claim 15, wherein said light-emitting means comprises a semiconductor laser.

* * * * *

UNITED STATES PATENT AND TRADEMARK OFFICE
CERTIFICATE OF CORRECTION

PATENT NO.    : 6,101,014
DATED         : August 8, 2000
INVENTOR(S)   : Masao Majima It is certified that error appears in the above-identified patent and that said Letters Patent is hereby corrected as shown below:

Column 2,
Line 16, "wavelength" should read -- wavelength is --;
Line 37, "to" should be deleted; and "span-" should read -- is capable of span- --.

Column 3,
Line 27, "with other" should read -- with --
Line 48, "mean" should read -- means --.

Column 7,
Line 23, "of" should be deleted.

Column 8,
Line 10, "SLmin" should read -- $\lambda$Lmin --.

Column 9,
Line 33, "the." should read -- the --.
Line 58, "to" should be deleted.

Column 11,
Line 39, "6al," should read -- $\lambda$ a1 --.

Column 12,
Line 40, "in" should be deleted.
Line 62, "$\lambda\Delta$" should be -- $\Delta\lambda$ --.

Column 15,
Line 20, "it" should be deleted.

Column 17,
Line 29, "one" should read -- ones --.

Column 18,
Line 21, "to" should be deleted.

UNITED STATES PATENT AND TRADEMARK OFFICE
CERTIFICATE OF CORRECTION

PATENT NO. : 6,101,014
DATED : August 8, 2000
INVENTOR(S) : Masao Majima

It is certified that error appears in the above-identified patent and that said Letters Patent is hereby corrected as shown below:

<u>Column 20,</u>
Line 9, "output" should read -- of output --.

Signed and Sealed this

Tenth Day of May, 2005

JON W. DUDAS
*Director of the United States Patent and Trademark Office*